(12) United States Patent
Diekmann et al.

(10) Patent No.: US 7,999,209 B2
(45) Date of Patent: Aug. 16, 2011

(54) WIRE DRIVE FOR WIRE FEEDER AND SPOOL GUN

(75) Inventors: Craig L. Diekmann, Mentor, OH (US); David W. Perrin, Wadsworth, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 12/507,523

(22) Filed: Jul. 22, 2009

(65) Prior Publication Data
US 2009/0302018 A1    Dec. 10, 2009

Related U.S. Application Data

(63) Continuation of application No. 11/083,839, filed on Mar. 18, 2005, now abandoned.

(51) Int. Cl.
*B23K 9/173* (2006.01)
(52) U.S. Cl. .................. 219/137.31; 219/137.2
(58) Field of Classification Search ............ 219/137.7, 219/137.2, 136; 228/180.5
See application file for complete search history.

(56) References Cited

U.S. PATENT DOCUMENTS

| | | | |
|---|---|---|---|
| 3,551,636 A | 12/1970 | Nelson | |
| 3,562,577 A | 2/1971 | Kensrue | |
| 3,632,959 A | 1/1972 | Nelson et al. | |
| 5,521,355 A | 5/1996 | Lorentzen | |
| 5,643,479 A | 7/1997 | Lloyd et al. | |
| 6,057,526 A | 5/2000 | Lee | |
| 6,064,036 A | 5/2000 | Kensrue | |
| 6,479,795 B1 * | 11/2002 | Albrecht et al. | 219/137.2 |
| 6,707,004 B2 * | 3/2004 | Matiash et al. | 219/137.2 |
| 2004/0004113 A1 * | 1/2004 | Blankenship | 235/375 |
| 2004/0026393 A1 | 2/2004 | Matiash et al. | |
| 2005/0014410 A1 | 1/2005 | Justice | |
| 2005/0199606 A1 | 9/2005 | Enyedy | |
| 2005/0205543 A1 | 9/2005 | Meckler | |
| 2005/0224482 A1 * | 10/2005 | Matiash | 219/137.2 |

OTHER PUBLICATIONS

Power MIG 255 Brochure-Publication E7-53, Nov. 2003.
Magnum SG Spool Gun Brochure-Publication E12-22, Aug. 2003.
MK Products Prince XL/Spool Gun-Owner's Manual.
LF-72 Wire Feeder Brochure-Publication E8-11, Aug. 2004.

* cited by examiner

*Primary Examiner* — Mark H Paschall
*Assistant Examiner* — Brian Jennison
(74) *Attorney, Agent, or Firm* — Shannon V. McCue; Louis F. Wagner; Hahn Loeser & Parks LLP

(57) ABSTRACT

A modular welding wire feed drive for use in a welding system. The welding wire feed drive is designed to be detachably connected to the welding wire feed system of the welding system. The welding wire feed drive includes a drive housing designed to be detachably connectable to the welding wire feed system, a wire contact arrangement designed to controllably feed welding wire through the welding wire feed drive, and a drive motor that is connected to or interconnected to the wire contact arrangement to at least partially drive the wire contact arrangement.

24 Claims, 7 Drawing Sheets

WIRE DRIVE FOR WIRE FEEDER AND SPOOL GUN

CROSS-REFERENCE TO RELATED APPLICATIONS

This application is a continuation application of U.S. patent application Ser. No. 11/083,839, filed May 18, 2005, the disclosure of which is hereby incorporated by reference in its entirety.

The present invention is related to the art of welding and more particularly to welders that include the use of wire feeders.

BACKGROUND OF THE INVENTION

Wire feeders for electric arc welders typically include a welding wire drive assembly that pulls welding wire from a welding wire source (e.g., wire spool, canister of wire, etc.) and then feeds the welding wire to the welding gun. The wire drive assembly typically includes one or more drive wheels that pull and push the welding wire at a desired or controlled wire feed speed so that the proper amount of molten metal is deposited on a workpiece during the formation of a weld bead or the like.

Two general configurations are used to feed welding wire to the welding gun. In one configuration, the wire feeder is connected to or integrated with the welder. In this configuration, the wire feeder includes an integrated motor, drive rollers, gears, and wire guides designed to draw the welding wire from a welding wire source and then push the welding wire through a welding cable and through the welding gun. The length of the welding cable is typically several feet long (e.g., 10-50 ft.). As such, more rigid welding wire (e.g., carbon steel based wire, stainless steel based wire, titanium wire, nickel based wire, etc) is used in such configurations. These types of welding wire are less likely to kink as the wire is pushed from the drive rollers of the wire feeder, through the welding cable and into and through the welding gun. Kinking of the welding wire as it is being fed to the welding gun can result in the welding wire becoming jammed in the welding cable and/or welding gun, thus requiring the welding process to be terminated and the jammed welding wire to be freed. Kinking of the welding wire can also result in erratic and/or improper welding wire feed rate during a welding operation.

For welding wire that is more prone to kinking (e.g., aluminum based wire, etc.), another configuration is typically used to feed the welding wire into and through the welding gun. In this configuration, the wire feeder is positioned on or closely adjacent to the welding gun. This welding gun is commonly referred to as a "spool" gun and is typically sold as a separate accessory. The wire feeder on the spool gun draws the welding wire from a welding wire source and pushes the welding wire through the welding gun. The welding wire source typically is a spool of wire connected to the spool gun, however, the welding wire can be drawn through the welding cable. The wire feeder on the spool gun also includes a motor, drive roller, gears and wire guides that draw the welding wire from a wire source and pushes the welding wire a short distance through the welding gun. The short distance that the welding wire is pushed results in a decreased incidence of kinking of the welding wire during a, welding process.

Many types of welders are designed for use in multiple types of welding operations that use many types of welding wires. Many welders come equipped with a wire feeder that is designed to push the welding wire through a cable to the welding gun. Commonly, these wire feeders are integrated with the welder; however, the wire feeder can be a separate device that is used in conjunction with the welding unit. Theses type of wire feeders are commonly used in many applications since the welding gun is lighter and smaller, thereby snaking the welding gun easier to use. Welding guns that include or are integrated with a wire feeder are typically bulkier and heavier. The inconvenience from the weight and bulkiness the welding gun is further aggravated when a, spool of welding wire is connected to the welding gun or wire feeder on the welding gun. However, when a welding operation requires the use of a less rigid wire (e.g., aluminum based wire, etc.), these types of welding guns are used. When such welding guns are connected to the welder by a welding cable, two wire feeders typically exist, one on the welding gun and one on the welding unit or a wire feeder that is used in conjunction with the welding unit. When the welding wire is drawn through the welding cable by the wire feeder on the welding gun, the wire feeder at the welding machine must be disabled so that the welding wire is only pulled to the welding gun. The operation of both wire feeders at the same time can result in improper wire feed rates and/or increased incidence of linking of the welding wire. The disabling of the wire feeder on the welding unit or on the separate wire feeder can be both inconvenient and time consuming.

Although the components of wire feeders on a spool gun and on a welding unit or separate wire feeder used in conjunction with a welding unit are very similar, the two wire feeders are separately purchased and their components are not interchangeable. As such, there are increased costs and inconveniences associated with having to purchase, maintain, and/or store two separate wire feeder arrangements. Therefore, there is a demand for a more versatile wire feeder arrangement that is simpler to use and is less costly.

SUMMARY OF THE INVENTION

The present invention is directed to an interchangeable and/or modular welding wire feed drive for welding wire used in a welding system such as, but not limited to, an electric arc welding system. In accordance with one aspect of the present invention, the welding wire feed drive is designed to be a modular-detachable unit. The welding wire feed drive system can be designed to be a) detachably connected to a wire feeder that is integrated in a welding unit, b) detachably connected to a separate wire feeder that is used in conjunction with a welding unit, and/or c) detachably connected to a wire feeder that is on or integrated with a welding gun. As can be appreciated, the welding wire feed drive can be designed to be detachably connected in other and/or additional ways and/or regions of a welding system. The welding wire feed drive is a versatile system that enables a user to configure the wire feeding arrangement of a welding system for a particular operation. When the welding system is to be used with a more rigid welding wire (e.g., carbon steel based wire, stainless steel based wire, titanium wire, nickel based wire, etc.), the welding wile teed drive is typically placed in a wire feeder system that is integrated in and/or is used in conjunction with a welding unit. In this configuration, the welding wire feed drive draws welding wire from a wire source and then pushes the welding wire through a welding cable that is connected to a welding gun and then through the welding gun to be deposited in molten from on a workpiece. When the welding system is to be used with a less rigid welding wire (e.g., aluminum based wire, etc.), the welding wire feed drive is typically placed in a wire feeder system that is on or integrated with a welding gun. In this configuration, the welding wire feed drive draws the welding wire from a wire source and then pushes the welding wire through the welding gun to be deposited in molten form on a workpiece. As can be appreciated, a more rigid welding wire can also be used in a spool gun, but such a setup is typically not used due to the disadvantages associated with the bulkiness and additional weight of a spool gun. The ability to use the welding wire feed drive in both types of welding operations reduces the amount of equipment an operator needs for various types of welding operations, simplifies the setup of the welding system when converting between a welding operation that uses a more rigid welding wire and a less rigid welding wire, and/or reduces the equipment cost associated with equipping the welding system for use in a variety of different welding operations.

In accordance with another and/or alternative aspect of the present invention, the welding wire feed drive includes a drive housing designed to be detachably connectable to the welding wire feed system. The drive housing is typically formed of a durable material (e.g., metal, plastic, reinforced polymers, etc.) so as to withstand the typical environment of a welding system and/or to protect one or more components contained within the drive housing. The drive housing is configured so that it can be both connected to a drive housing interface on 1) a stand-alone wire feeder and/or a wire feeder integrated in a welder unit and 2) a welding gun and/or wire feeder system integrated with a welding gun. In one specific design, the drive housing interface of a welding gun may merely constitute a welding gun handle that is connectable to the drive housing; however, it can be appreciated that the drive housing interface on a welding gun can be some other and/or additional component. As can also be appreciated, the drive housing can be designed to be detachably connected in other and/or additional regions of a welding system. The configuration of the drive housing is selected to facilitate in the ease and convenience of connecting and disconnecting the drive housing from the drive housing interface. The drive housing can include one or more connectors (e.g., tabs, latches, clips, quick-connect, etc.) that facilitate in releasably securing the drive housing to the drive housing interface.

In accordance with still another and/or alternative aspect of the present invention, the welding wire feed drive includes a wire contact arrangement designed to contact the welding wire and to drive the welding wire at least partially through the welding wire feed drive. In one non-limiting embodiment, the wire contact arrangement includes at least one drive roller. As can be appreciated, other and/or additional configurations can be used. The drive roller can include one or more rough surfaces to facilitate in the gripping of the welding wire so as to reduce slippage of the welding wire. When two drive rollers are used, the drive rollers can be positioned adjacent to one another and rotated in opposite directions to drive the welding wire between the drive rollers. One or both of the drive rollers can include a groove used to guide and maintain the welding wire between the drive rollers as the drive rollers move the welding wire through the welding wire feed drive. As can be appreciated other and/or additional arrangements for the wire contact arrangement can be used. The tension of the wire contact arrangement on the welding wire can be fixed or adjustable. In one non-limiting design, the tension of the wire contact arrangement on the welding wire is preset and fixed so as to ensure that the proper wire tension is applied to the welding wire. The proper tension on the welding wire facilitates in ensuring that the wire contact arrangement properly engages and drives the weld wire, thus reducing or preventing incidences of wire slippage which can adversely affect the feed rate of the welding wire. If the tension is adjustable, the drive housing can be designed to enable a user to open and/or access the wire contact arrangement in the drive housing, and/or include an adjustment knob, screw, button, etc. that enables a user to adjust the tension on the welding wire without having to open and/or access the interior region of the drive housing. In one non-limiting design, the drive housing allows access to one or more components in the drive housing to enable the user to adjust, repair, and/or replace one or more components in the drive housing. The wire contact arrangement can be partially or fully contained in the drive housing.

In accordance with yet another and/or alternative aspect of the present invention, the welding wire feed drive can include one or more drive motors connected to or interconnected to the wire contact arrangements which are used to directly or indirectly at least partially drive the wire contact arrangement. The one or more motors are typically electrical motors that are powered by their own power supply (e.g., battery, etc.), from power generated by the welding system (e.g., electric generator, etc.), and/or from an external power source (e.g., electric plug, etc.). The one or more motors can be partially or fully contained in the drive housing.

In accordance with still yet another and/or alternative aspect of the present invention, the welding wire feed drive can include a gear arrangement used to at least partially interconnect the one or more drive motors to the wire contact arrangement. The gear arrangement can include one or more gears. When the wire contact arrangement includes two drive rollers, the gear arrangement can be used to at least partially cause the two drive rollers to rotate at a desired speed with respect to one another. The gear arrangement can be partially or fully contained in the drive housing.

In accordance with still yet another and/or alternative aspect of the present invention, the welding wire feed drive can include one or more wire guides designed to at least partially guide the welding wire within the drive housing. In one non-limiting arrangement, there is provided a wire guide that at least partially guides the welding wire from the wire contact arrangement to an exterior of the drive housing. The wire guide is typically designed to facilitate in the guiding of the welding wire through an opening in the drive housing and/or to reduce the incidence of the welding wire kinking or bending as the welding wire is pushed from the wire contact arrangement. In another and/or alternative non-limiting arrangement, there is provided a wire guide that at least partially guides the welding wire as the welding wire is fed to the wire contact arrangement. The wire guide is typically designed to facilitate in the guiding of the welding wire through an opening in the drive housing and/or from a welding wire source within the drive housing, and/or to reduce the incidence of the welding wire kinking or bending as the welding wire is fed to the wire contact arrangement. In one non-limiting design of the wire guide, the wire guide includes a cylindrically shaped passageway that has an inner diameter that is a little larger than the diameter of the welding wire so as to allow the welding wire to pass through the cylindrically shaped passageway while inhibiting or preventing the welding wire from kinking as it passes through the cylindrically shaped passageway. As can be appreciated, other and/or additional designs of the wire guide can be used. The one or more wire guides can be partially or fully contained in the drive housing.

In accordance with a further and/or alternative aspect of the present invention, the welding wire feed drive can include a drive housing that includes a wire spool compartment designed to contain a spool of welding wire. The wire spool compartment can include a spool mount designed to support the wire spool in a certain position in the wire spool compartment and to enable the wire spool to rotate as the welding wire is unwound from the wire spool. In one non-limiting arrangement, the drive housing can be opened, and/or include an opening and/or openable access to the wire spool compartment to enable the wire spool to be replaced; however, this is not required.

As can be appreciated, many other and/or additional configurations of the wire spool compartment in the drive housing can be used. In another and/or alternative non-limiting arrangement, a wire spool tension arrangement is provided to at least partially provide tension to the wire spool in the wire spool compartment. When the wire spool is freely rotatable, the welding wire on the wire spool can partially unravel or unwind from the spool, thereby resulting in entanglement of the welding wire and/or kinking of the welding wire. The wire spool tension arrangement inhibits or prevents the wire spool from freely rotating thereby maintaining a tension on the welding wire as the welding wire is fed through the welding wire feed drive. The tension on the wire spool inhibits or prevents undesired unwinding or unraveling of the welding wire from the wire spool. The wire spool tension arrangement can provide an adjustable or faxed tension to the wire spool. The wire spool tension arrangement can be partially or fully contained in the drive housing. In still another and/or alternative non-limiting arrangement, the welding wire source is fed to the wire contact arrangement so as to facilitate in the proper feeding of the welding wire from the welding wire feed drive. In one non-limiting design, when the drive housing includes a spool of welding wire, the maximum angle that the welding wire is fed to the wire contact arrangement from the wire spool relative to a feed axis is less than about 50°, and typically less about 45°. The feed axis is defined as the axis at which the wire is fed through the wire contact arrangement. As such, when the wire contact arrangement includes two drive rollers, the feed axis is along the plane that divides the two drive rollers. When the angle of the welding wire from the wire spool relative to the feed axis is too great, the incidence of wire slippage through the wire contact arrangement can increase and/or the desired welding wire feed rates cannot be properly maintained. In another and/or alternative non-limiting design, the wire spool is oriented in the spool compartment of the drive housing such that when the wire spool is about half depleted, the angle that the welding wire is fed to the wire contact arrangement from the wire spool relative to a feed axis is about 0-20°, and typically about 0-15°, and even more typically about 0-10°. In still another and/or alternative non-limiting design, when the welding wire is fed from a source external to the drive housing, the maximum angle that the welding wire is fed to the wire contact arrangement from the external welding wire source relative to the feed axis is less than about 50°, and typically less than about 45°. In one particular non-limiting design, the welding wire, that is supplied from a source external to the drive housing, has an angle to the feed axis from the point the welding wire enters the drive housing to the wire contact arrangement of about 0-20°, and typically about 0-15°, and even more typically about 0-10°.

In accordance with still a further and/or alternative aspect of the present invention, the welding wire feed drive can include a drive housing that has a front and back wire opening. At least one of the wire openings can be designed to be detachably connectable to a welding cable. In one non-limiting arrangement, the back wire opening is designed to be connectable to a welding cable. This arrangement can exist when the welding wire feed drive is connected to a welding gun. The welding cable is typically used to provide current from the welding unit to the welding gun. A welding wire can also be fed through the cable or be fed from a welding wire source inside the drive housing. In another and/or alternative non-limiting arrangement, two back wire opening are included on the drive housing. The first wire opening can be designed to be connectable to a welding cable. This arrangement can also exist when the welding wire feed drive is connected to a welding gun. The welding cable is typically used to provide current from the welding unit to the welding gun. The second wire opening can be designed to receive welding wire, such as from a spool of wire connected to the welding gun. When the welding wire feed drive is used on a welding gun, the front wire opening can be designed to be connected to the front portion or barrel of the welding gun. The front opening enables the welding wire to pass through the barrel of the gun and then through the tip of the welding gun. The connection arrangement for the welding cable and/or the front portion of the welding gun can be a threaded connection or some other or additional connection that enables an operator to detachably connect such components to the welding wire feed drive. In still another and/or alternative non-limiting arrangement, the front wire opening is designed to be connectable to a welding cable. This arrangement can exist when the welding wire feed drive is connected to a separate wire feeder used in conjunction with a welding unit or a wire feeder integrated in a welding unit. The welding cable is typically used to provide current from the welding unit to the welding gun and to also provide a pathway for the welding wire to the welding gun. The back wire opening can be used to provide an access to the welding wire into the drive housing from a source of welding 10 wire (e.g., drum of welding wire, spool of welding wire, package of welding wire, etc.); however, the back wire opening may not be used when the source of welding wire is contained within the drive housing. The connection arrangement for the cable and/or guide for an external welding wire source can be a threaded connection or some other or additional connection that enables an operator to detachably connect such components to the welding wire feed drive.

In accordance with yet a further and/or alternative aspect of the present invention, the welding wire feed drive can include an identification arrangement that provides information about the welding wire feed drive. Many types of information can be provided by the identification arrangement. Such information can include, but is not limited to, the type of welding wire to be used with the welding wire feed drive, the type of welding wire included in the drive housing, the diameter of welding wire to be used with the welding wire feed drive, the gear ratio of the gear arrangement in the drive housing, the type of motor in the drive housing, the speed and/or recommended speed of the motor in the drive housing, the wire tension and/or recommended tension associated with the wire contact arrangement, the current and/or recommended spool break tension, the set and/or recommended welding wire feed speed, the amount of welding wire remaining on the wire spool, the amount and/or time of use of the welding wire feed drive, model information about the welding wire feed drive, parts information regarding the welding wire feed drive, information about when and/or in what welding unit the welding wire feed drive was used, information about the proper welding unit the welding wire feed drive can be used with, voltage information for operation of the welding wire feed drive, current information for the operation of the welding wire feed drive, voltage information for the welding power wave, current information for the welding power wave, welding wire polarity information for the welding power wave and/or shielding gas information. The identification arrangement can provide information to the welding system (e.g., welding unit, welding gun, stand alone wire feeder unit used in conjunction with a welding unit, wire feeder integrated in a welding unit, etc.) mechanically (e.g., one or more ridges and/or indents that contact a surface that detects the ridges and/or indents, etc.), visually (e.g., bar code, etc.), electromagnetically (e.g., radio waves, infrared light, lasers, etc.) and/or electronically (e.g., information chip, electrical circuit, certain pattern of electrical contacts, etc.). As can be appreciated, many different arrangements can be used to convey information about the welding wire feed drive to the welding system. In one non-limiting arrangement, at least a portion of the identification arrangement is located on the exterior surface of the drive housing so as to facilitate in the transfer of information between the welding wire feed drive and the welding system; however, this is not required.

In accordance with still yet a further and/or alternative aspect of the present invention, the welding wire feed drive can include a control interface that provides information between the welding wire feed drive and the welding system (e.g., welding unit, welding gun, stand alone wire feeder unit used in conjunction with a welding unit, wire feeder integrated in a welding unit, etc.). This information can include, but is not limited to, control information to control the operation of the welding wire feed drive (e.g., control motor speed, adjust welding wire tension, adjust wire spool tension, change gearing of gear arrangement, etc.) and/or the information can include current operating conditions of the welding wire feed drive (e.g., speed of motor, wire feed speed, amount of welding wire remaining on wire spool, welding wire tension, wire spool tension, etc.). The control interface can transfer such information electronically (e.g., via electrical contacts); however; the information can alternatively or additionally be transferred by various types of electromagnetic waves (e.g., radio waves, infrared light, lasers, etc.) and/or other and/or additional means. In one non-limiting arrangement, at least a portion of the control interface is located on the exterior surface of the drive housing so as to facilitate the transfer of information between the welding wire feed drive and the welding system; however, this is not required. When a control interface and an identification arrangement are included with the welding wire feed drive, the control interface and the identification arrangement can be integrated together; however, this is not required.

In accordance with another and/or alternative aspect of the present invention, the welding wire feed drive can include a visual identifier to enable a user to easily and/or conveniently identify at least one characteristic of the welding wire feed drive. In one non-limiting arrangement, the visual identifier includes one or more colors on the welding wire feed drive and/or packaging for the welding wire feed drive. The color coding on the welding wire feed drive and/or packaging for the welding wire feed drive can be representative of the type of welding unit the welding wire feed drive can be used in and/or the type of welding wire that is to be used with and/or is contained in the welding wire feed drive. As can be appreciated, the color coding can be representative of other and/or additional characteristics of the welding wire feed drive (e.g., diameter of the welding wire in the welding wire feed drive, amount of welding wire in the welding wire feed drive, shielding gas to be used with the welding wire in the welding wire feed drive, type of welding gun that can be used with the welding wire feed drive, the type of welding operations recommended for use with the welding wire feed drive, etc.). As can also be appreciated, other and/or additional visual identifiers (e.g., model numbers, model names, etc.) can be used on the welding wire feed drive and/or packaging for the welding wire feed drive to provide a user with easy and/or convenient information about at least one characteristic of the welding wire feed drive.

In accordance with another and/or alternative aspect of the present invention, the welding wire feed drive can include a drive housing that is conveniently detachably connectable to a gun handle of a welding gun to facilitate in the use of the welding wire feed drive with the welding gun. The gun handle can be designed so that when it is connected to the welding wire feed drive, an operator can more conveniently handle and/or use the welding gun. In one non-limiting gun handle configuration, the gun handle is designed so as to protect and/or house one or more regions of the welding wire feed drive so as to provide protection to the welding wire feed drive. As can be appreciated, many different gun handle designs can be used. The handle can also be designed to include a trigger that is used to activate the welding wire feed drive so as to cause the welding wire to advance from the tip of the welding gun. In such a design, the handle can include mechanical connections, electrical connections, etc., to enable the trigger to activate the welding wire feed drive. As can be appreciated, the handle can include other and/or additional controls to control and/or operate other features of the welding wire feed drive and/or other components of the welding system.

In accordance with still another and/or alternative aspect of the present invention, the welding wire feed drive can include a wire spool cartridge detachably connectable to the drive housing. The wire spool cartridge can include a cartridge housing designed to at least partially house the components of the wire spool cartridge. The cartridge housing can be formed of a durable material (e.g., metal, plastic, reinforced polymers, etc.) so as to withstand the typical environment of a welding system and/or to protect one or more components contained within the cartridge housing. The cartridge housing can include one or more connector arrangements (e.g., tabs, latches, clips, etc.) that facilitate in releasably securing the cartridge housing to the drive housing of the welding wire feed drive. The wire spool cartridge can also include a spool of welding wire and a wire contact arrangement designed to contact the welding wire and drive the welding wire at least partially through the wire spool cartridge. In one non-limiting embodiment, the wire contact arrangement includes at least one drive roller. As can be appreciated, other and/or additional configurations can be used. The drive roller can include one or more rough surfaces to facilitate in the gripping of the welding wire so as to reduce slippage of the welding wire. When two drive rollers are used, the drive rollers can be positioned adjacent to one another and rotated in opposite directions to drive the welding wire between the drive rollers. One or both of the drive rollers can include a groove used to guide and maintain the welding wire between the drive rollers as the drive rollers move the welding wire through the welding wire feed drive. As can be appreciated other and/or additional arrangements for the wire contact arrangement can be used. The spool of welding wire can be rotatably secured in the cartridge housing. A tension arrangement can be provided to create tension on the spool and/or tension on the wire by the wire contact arrangement so that a desired proper welding wire tension exists without any intervention by the user. As such, the drive roll tension and the spool break tension can be preset and need not be adjusted by the user; however, this is not required. The cartridge housing can be configured so as not to be easily opened by a user. In such a configuration, the cartridge housing is designed to be disposable after the welding wire on the spool within the cartridge housing is expended, As can be appreciated, the cartridge housing can be designed to allow access to the wire spool to enable a user to replace the wire spool. The wire contact arrangement and the wire spool are partially or fully contained in the cartridge housing. The wire spool cartridge can include a gear arrangement used to at least partially interconnect the one or more drive motors to the wire contact arrangement. The wire spool cartridge can be absent one or more drive motors that are used to drive the wire contact arrangement; however, this is not required. These one or more motors are typically located on other regions of the welding wire feed drive and/or on a wire feeder or in the welding unit. The gear arrangement can include one or more gears. When the wire contact arrangement includes two drive rollers, the gear arrangement can be used to at least partially cause the two drive rollers to rotate at a desired speed with respect to one another. The gear arrangement can be partially or fully contained in the cartridge housing. The wire spool cartridge can include one or more wire guides designed to at least partially guide the welding wire within the cartridge housing. In one non-limiting arrangement, there is provided a wire guide that at least partially guides the welding wire from the wire contact arrangement to an exterior of the cartridge housing. The wire guide can be designed to facilitate in the guiding of the welding wire through an opening in the cartridge housing and/or to reduce the incidence of the welding wire kinking or bending as the welding wire is pushed from the wire contact arrangement. In another and/or alternative non-limiting arrangement, there is provided a wire guide that at least partially guides the welding wire as the welding wire is fed to the wire contact arrangement. The wire guide can be designed to facilitate in the guiding of the welding wire from the wire spool within the cartridge housing to the wire contact arrangement to reduce the incidence of the welding wire kinking or bending as the welding wire is fed to the wire contact arrangement. In one non-limiting design of the wire guide, the wire guide includes a cylindrically shaped passageway that has an inner diameter that is a little larger than the diameter of the welding wire so as to allow the welding wire to pass through the cylindrically shaped passageway while inhibiting or preventing the welding wire from kinking as it passes through the cylindrically shaped passageway. As can be appreciated, other and/or additional designs of the wire guide can be used. The one or more wire guides can be partially or fully contained in the cartridge housing. The wire spool cartridge can include a cartridge identification arrangement that provides information about the wire spool cartridge. Many types of information can be provided by the cartridge identification arrangement. Such information can include, but is not limited to, the type of welding wire in the cartridge housing, the diameter of welding wire in the cartridge housing, the gear ratio of the gear arrangement in the cartridge housing, the wire tension associated with the wire contact arrangement, the spool break tension of the wire spool in the cartridge housing, welding wire feed speed setting, the amount of welding wire remaining on the wire spool, model information about the wire spool cartridge, parts information regarding the wire spool cartridge, information about the proper welding unit the wire spool cartridge can be used with, voltage information for the welding power wave, current information for the welding power wave, welding wire polarity information for the welding power wave and/or shielding gas information. The cartridge identification arrangement can provide information about the wire spool cartridge mechanically (e.g., one or more ridges and/or indents that contact a surface that detects the ridges and/or indents, etc.), visually (e.g., bar code, etc.), electromagnetically (e.g., radio waves, infrared light, lasers, etc.) and/or electronically (e.g., information chip, electrical circuit, certain pattern of electrical contacts, etc.). As can be appreciated, many different arrangements can be used to convey information about the wire spool cartridge. In one non-limiting arrangement, at least a portion of the cartridge identification arrangement is located on the exterior surface of the cartridge housing so as to facilitate the transfer of information between the wire spool cartridge and the welding wire feed drive and/or the welding system; however, this is not required. The wire spool cartridge can include a cartridge control interface that provides information between the wire spool cartridge and the welding wire feed drive and/or the welding system. This information can include, but is not limited to, information about the current operating conditions of the wire spool cartridge (e.g., wire feed speed, amount of welding wire remaining on wire spool, welding wire tension, wire spool tension, gearing ratio, etc.). As cars be appreciated other and/or additional information can be transferred between the cartridge control interface. The cartridge control interface can transfer such information electronically (e.g., via electrical contacts); however; the information can alternatively or additionally be transferred by various types of electromagnetic waves (e.g., radio waves, infrared light, lasers, etc.), and/or by other and/or additional means. In one non-limiting arrangement, at least a portion of the cartridge control interface is located on the exterior surface of the cartridge housing so as to facilitate the transfer of information between the wire spool cartridge and the welding wire feed drive and/or the welding system; however, this is not required. As can be appreciated, the cartridge control interface and the cartridge identification arrangement can be integrated together; however, this is not required. The wire spool cartridge can include a, visual identifier to enable a user to easily and/or conveniently identify at least one characteristic of the wire spool cartridge. In one non-limiting arrangement, the visual identifier includes one or more colors on the wire spool cartridge and/or packaging for the wire spool cartridge, The color coding can be representative of the type of welding unit and/or the type of welding wire feed drive the wire spool-cartridge can be used in and/or the type of welding wire that is contained in the cartridge housing of the wire spool cartridge. As can be appreciated, the color coding can be representative of other and/or additional characteristics of the wire spool cartridge. As can also be appreciated, other and/or additional visual identifiers (e.g., model numbers, model names, etc.) can be used on the wire spool cartridge and/or packaging for the wire spool cartridge to provide a user with easy and/or convenient information about at least one characteristic of the wire spool cartridge.

One object of the present invention is to provide an interchangeable and/or modular welding wire feed drive for use in a welding system.

Another and/or alternative object of the present invention is the provision of a welding wire feed drive that can be detachably connected to a wire feeder system that is connected to and/or integrated with a welding gun, and/or a wire feeder system that is integrated in and/or is used in conjunction with a welding unit.

Still another and/or alternative object of the present invention is the provision of a welding wire feed drive that includes a drive housing, a wire contact arrangement, a drive motor, a gear arrangement, a wire guide, a wire spool compartment, and/or a spool of welding wire.

Yet another and/or alternative object of the present invention is the provision of a welding wire feed drive that can include an identification arrangement that provides information about the welding wire feed drive.

Still yet another and/or alternative object of the present invention is the provision of a welding wire feed drive that can include a control interface that provides information between the welding wire feed drive and the welding system.

A further and/or alternative object of the present invention is the provision of a welding wire feed drive that can include a visual identifier to enable a user to easily and/or conveniently identify at least one characteristic of the welding wire feed drive.

Still a further and/or alternative object of the present invention is the provision of a welding wire feed drive that can include a wire spool cartridge that is detachably connectable to the drive housing.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein.

DESCRIPTION OF THE PREFERRED EMBODIMENT

Figure 1:
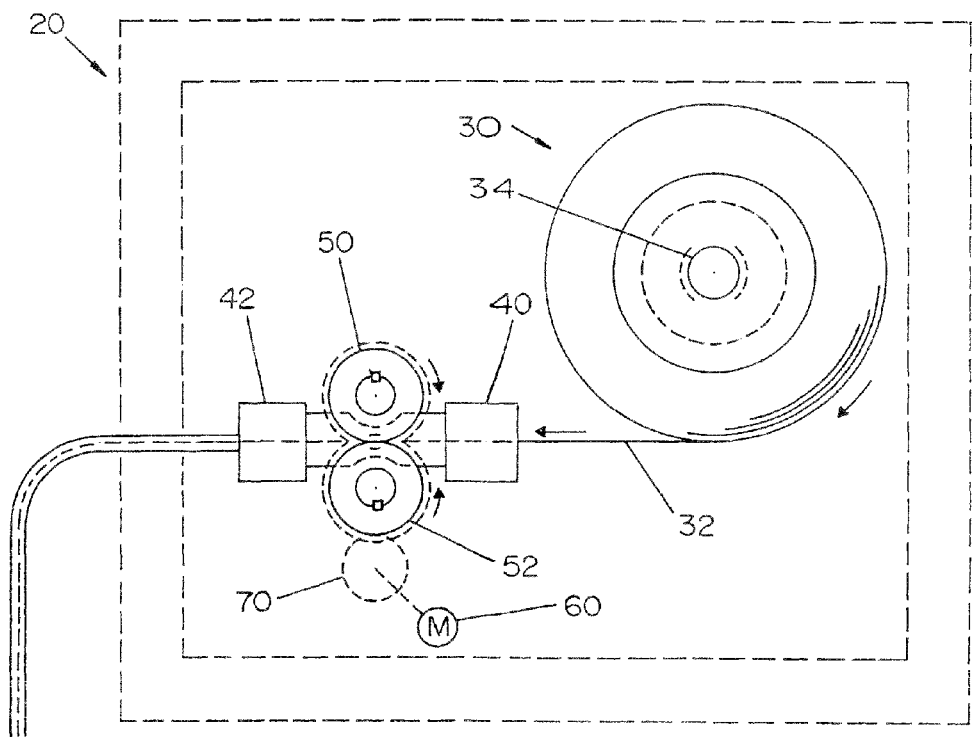
FIG. 1 is a schematic elevation view of a prior art wire feeder that feeds welding wire into a welding gun.
Figure 2:
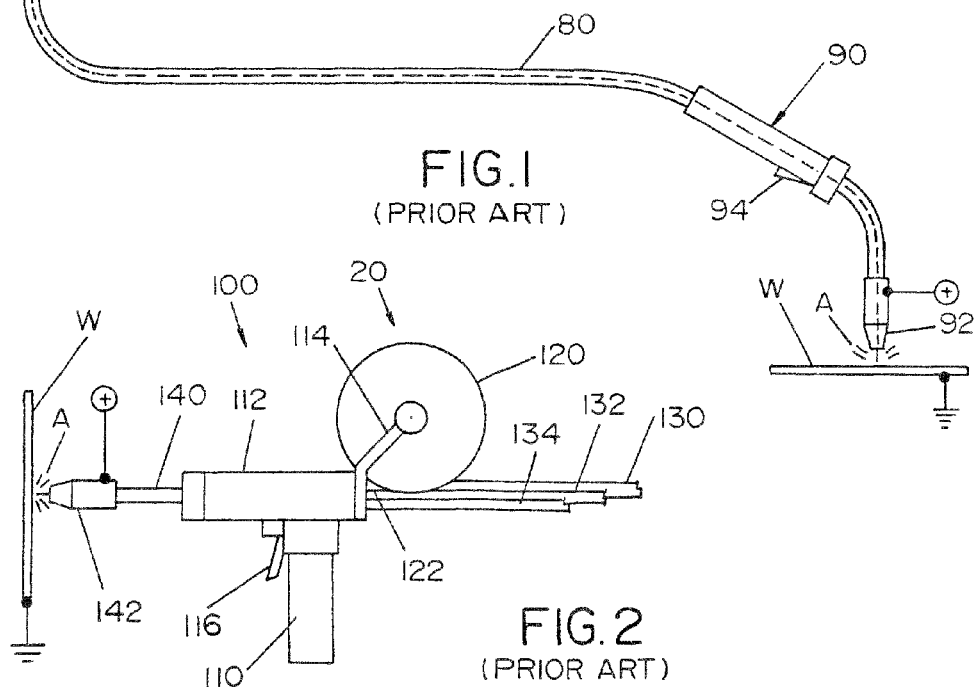
FIG. 2 is a schematic elevation view of a prior art spool gun having a wire feeder integrated in 5 the welding gun.

Referring now to the drawings, wherein the showings are for the purposes of illustrating the preferred embodiments of the invention only and not for the purpose of limiting the same, FIGS. 1 and 2 illustrate a prior art wire feeder 20 and a prior art welding spool gun 100, respectively. Prior art wire feeder 20 is representative of a wire feeder integrated in a welding unit, not shown, such as, but not limited to, the Power MIG 225 offered by The Lincoln Electric Company, or a stand alone wire feeder that is used in conjunction with a welding unit, not shown, such as, but not limited to, the LF-72 Wire Feeder offered by The Lincoln Electric Company; however, the wire feeder is not limited to these two models of welding units or stand-alone wire feeders.

Stand-alone or integrated wire feeder 20 includes a reel or spool 30 of welding wire 32 rotatably positioned on a spindle 34. The welding wire 32 is feed into a wire guide 40 that directs the welding wire to drive rollers 50, 52. A motor 60 causes the drive rollers to rotate in opposite directions by the use of a gear arrangement 70. The rotation of the drive rollers causes the welding wire to be drawn from reel 30 at a controlled rate and to push the welding wire through a second wire guide 42. The welding wire continues to be pushed by the drive rollers into a welding cable 80 that is connected to the wire feeder. The welding wire passes through the welding cable and into a welding gun 90, and then through the tip 92 of the welding gun to be deposited in molten form on workpiece W. An electric arc A is used to melt the advancing welding wire. The welding gun includes a trigger 94 to send a signal to the wire feeder and/or welding unit to control the operation of motor 60.

Prior art spool gun 100 is representative of the MAGNUM SG spool gun or the PRINCE XL spool gun offered by The Lincoln Electric Company; however, spool gun 100 is not limited to these two models of spool guns. The prior art spool gun includes a handle 110 and a body 112. Connected to the body is a bracket 114 that supports a wire spool 120. Wire spool 120 includes welding wire 122. Connected to the rear of body 112 are one or more cables 130, 132, 134. These cables typically provide a welding current to the spool gun, and transfer one or more control signals between the spool gun and the welding unit and/or some other component of the welding system, not shown. One of the cables can also be connected to a wire feeder that is integrated in a welding unit or is a stand alone wire feeder that is designed to supply welding wire from the wire feeder to the spool gun. Welding wire is typically not supplied by the cable when the wire spool 120 is used to provide welding wire to the spool gun. The spool gun also includes drive rollers, not shown, in the body of the spool gun. A motor, not shown, is typically positioned in the handle 110 and is connected to the drive roller by gears, not shown. A trigger 116 is used to control the operation of the motor to cause the welding wire to be advanced by the drive rollers. A gun barrel 140 is connected to the front end of body 112 and a welding tip 142 is connected to the front end of gun barrel 140. The welding wire that is pushed through the gun barrel and welding tip by the drive rollers is melted by an electric arc A and the molten metal is deposited on workpiece W.

The configuration of the MAGNUM SC spool gun and the PRINCE XL spool gun are such as to enable a user to modify the welding guns and to use these welding guns both as a spool gun and as welding gun without a spool wire. The modification of the welding gun from a spool gun to a welding gun without a spool typically requires the removal of the spindle and wire spool from the welding gun, the disengagement of the motor in the welding gun and the disengagement of the drive rollers from the welding wire in the welding gun. The weight of the welding gun is reduced by the removal of the spindle and wire spool, but the added weight associated with the drive rollers, gears and motor remain. When the welding gun is converted back into a spool gun, the spindle and wire spool are reconnected to the welding gun and the motor and drive roller are reengaged. The components and operation of prior art wire feeders and spool guns are well known in the art, thus a detailed description of such operation and components will not be further discussed.

The current configuration of spool guns requires the welding gun to be reconfigured or substituted for another welding gun when converted for use between a welding operation that uses rigid welding wire and a welding operation that uses less rigid welding wire, Welding guns such as the MAGNUM SG spool gun and the PRINCE XL spool gun can be converted for use in both types of operations; however some welding guns are designed to be dedicated for a single use. As such, additional welding guns may have to be purchased for use in various types of welding operations. When the welding gun is a spool gun or converted into a spool gun so that the welding wire is supplied through a welding cable to the welding gun, the wire feed arrangement on the wire feeder that is integrated with a welding unit or on a stand-alone unit must be partially or fully disengaged; other wise increased incident of kinking of the welding wire will occur and/or increased incidence of improper wire feed rates will occur. For instance, a welding unit such as the Power MIG 255 can be used with or without a spool gun. The welding unit includes a wire feeder integrated in the welding unit. A spool of welding wire is also housed within the welding unit.

When a spool gun is used on such a welding unit and the welding wire is to be supplied from the welding unit, the drive rollers on the wire feeder in the welding unit are required to be adjusted or disengaged from the welding wire so that only the drive wheels on the spool gun cause the welding wire to be drawn to the welding gun through a welding cable without the drive roller in the welding unit simultaneously pushing the welding wire through the welding cable to the welding gun. This adjustment is time consuming and/or can increase incidence of damage to the drive roller arrangement in the welding unit and/or cause the drive roller arrangement to become misaligned, etc. Similarly, when the welding procedure does not require the use of a spool gun, the spool gun is required to be converted into a non-spooling arrangement or replaced with a welding gun that is not a spool gun. The conversion of the spool gun to a non-spooling arrangement can be time consuming and/or can increase incidence of damage to the drive roller arrangement in the welding gun and/or cause the drive roller to become misaligned, etc. Furthermore, the drive rollers in the welding unit must now be reengaged and the tension on the drive roller arrangement and the wire spool properly adjusted.

Figure 3:
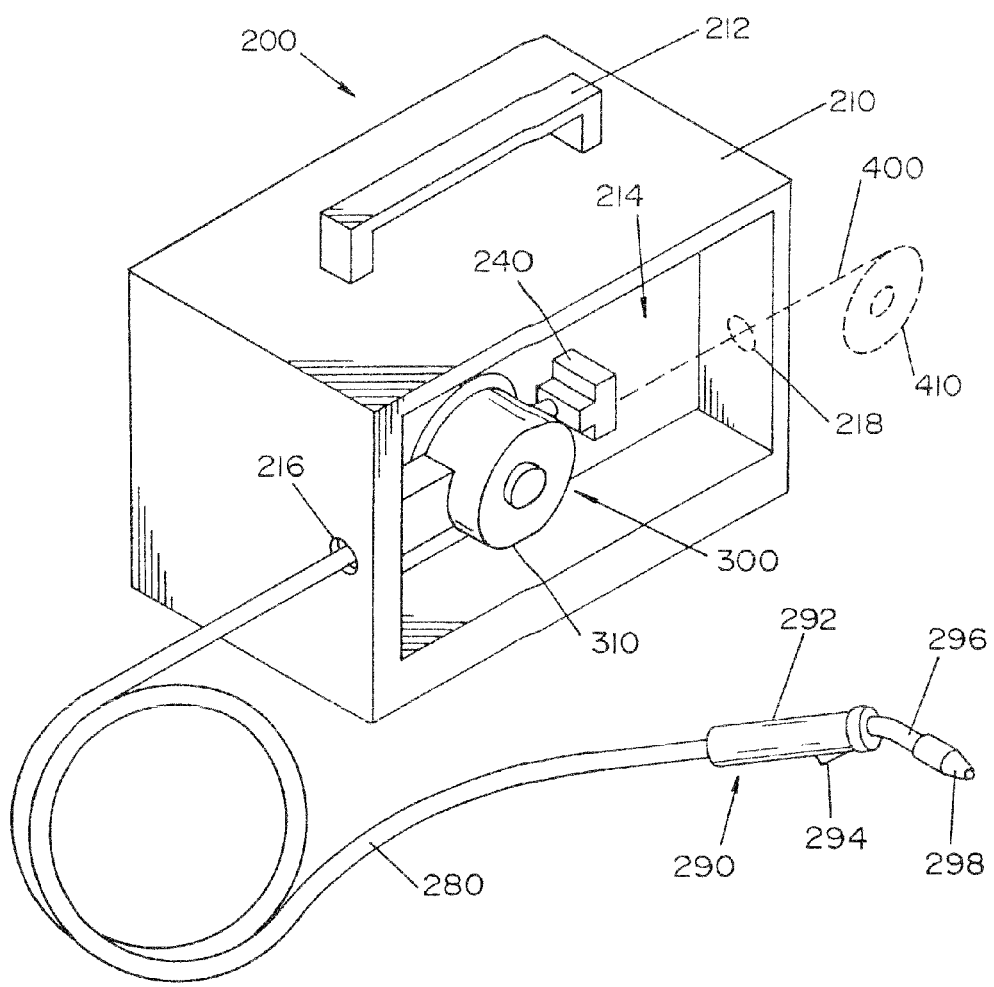
FIG. 3 is a front schematic elevation view of a wire feeder that feeds welding wire into a welding gun in accordance with the present invention.
Figure 4:
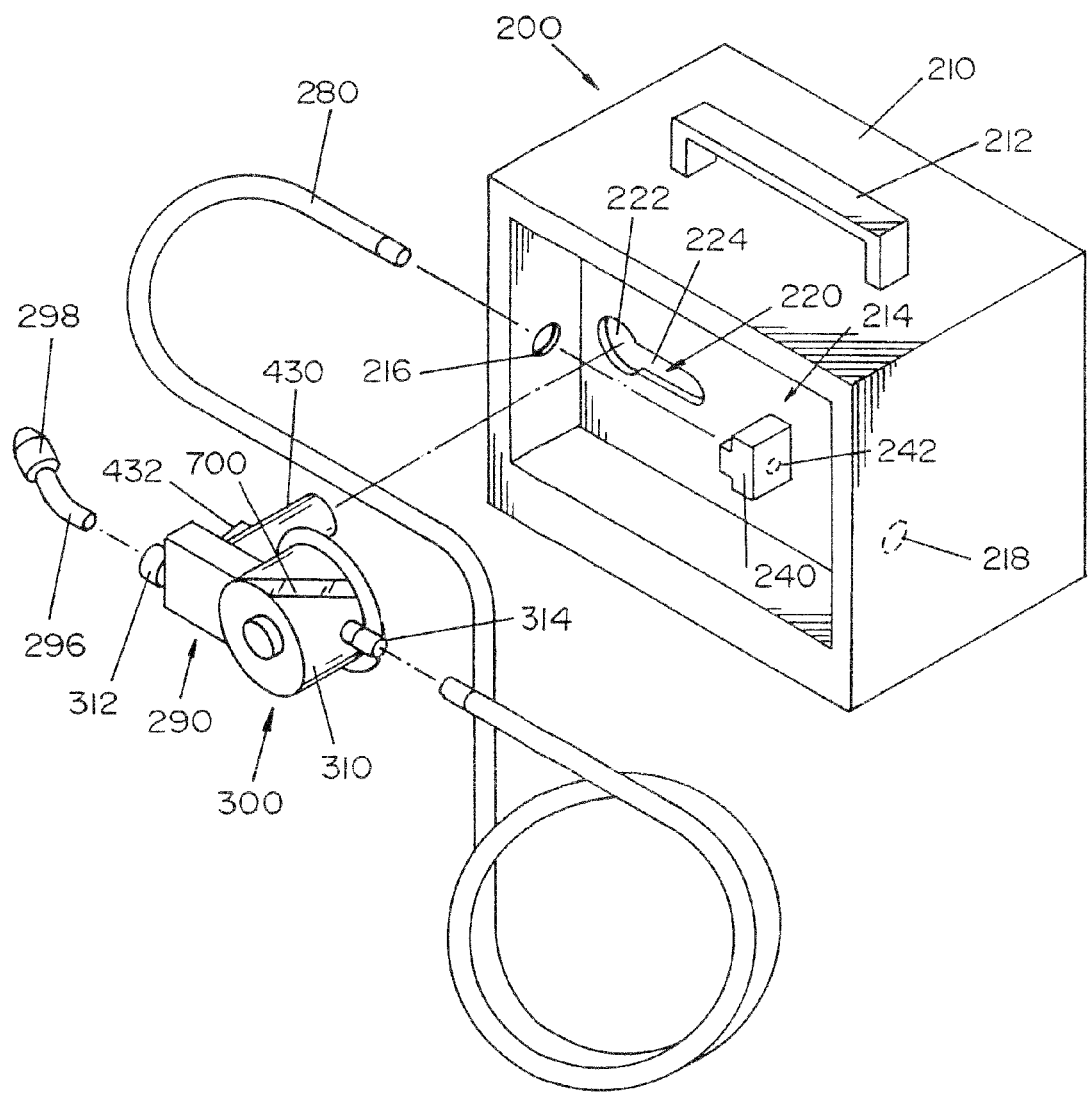
FIG. 4 is a partial exploded front perspective view of the wire feeder illustrated in FIG. 3.

Referring now to FIGS. 3-10, there is illustrated a wire feeder 200 which includes a housing 210 with a handle 212. Connected to the wire feeder is a welding cable 280. One end of the welding cable is positioned in front opening 216 of housing 210. The other end of the welding cable is connected to welding gun 290. The welding gun includes a body 292 and a trigger 294 to control the advancement of welding wire through the welding gun. The welding gun also includes a barrel 296 that is connected at one end to body 292 and at the other end to welding tip 298. Positioned inside a side cavity 214 of the housing of the wire feeder is a welding wire feed drive 300. The welding wire feed drive is detachably connected to a drive housing interface 220 that is positioned in the side cavity of the housing. As illustrated in FIG. 4, the drive interface 220 has a shape that enables the welding wire feed drive to be easily connected and disconnected from the housing. The drive interface can have a shape that only allows the welding wire feed drive to be oriented and connected in a certain manner to ensure that the welding wire feed drive has been properly connected to the housing.

Welding wire feed drive 300 includes a housing 310 that has a front opening 312 and a rear opening 314. As shown in FIG. 3, the front opening is adapted to be connected to one end of welding cable 280. The front opening can include a connection arrangement (e.g., threaded connection, clamp connection, quick-release connector, etc.) to facilitate in securing the end of the welding cable to the front opening. The rear opening can be adapted to 1) receive a welding wire 400 that is provided from an external welding wire source, 2) provide access to one or more electrical connections to provide power to one or more components in the welding wire feed drive, 3) provide communication and/or control signals between the welding wire feed drive and the wire feeder and/or welding gun, and/or 4) facilitate in the connection of the welding wire feed drive to the wire feeder. Alternatively, the rear opening could be plugged closed when the welding wire feed drive is detachably connected to a drive housing interface 220 of housing 210. As illustrated in FIG. 3, a dotted line represents welding wire 400 that is being provided from an external source 410 (e.g., wire spool, wire drum, wire package, etc). Housing 210 can include a rear opening 218 that enables an external source of welding wire to enter the housing of the wire feeder. As can be appreciated, the external source of welding wire can be positioned in cavity 214 of the housing 210, thus eliminating the need for rear opening 218. When an external source of welding wire is used, an opening 242 is located in interface block 240 that is positioned in cavity 214. Interface block 240 can be adapted to 1) enable rear opening 314 of housing 310 of the welding wire feed drive to be detachably secured so as to facilitate in connecting and securing the welding wire feed drive to the wire feeder, 2) provide an electrical interface between the wire feeder and the welding wire feed drive so as to enable communication and/or control between the welding wire feed drive and the wire feeder and/or welding gun, 3) provide an electrical interface between the wire feeder and the welding wire feed drive so as to supply power to the welding wire feed drive, and/or 4) guide an external welding wire source into the rear opening 314 of the welding wire feed drive. The welding wire feed drive, when connected to the drive housing interface 220, is designed to push welding wire through welding cable 280 and into and through welding gun 290.

Figure 5:
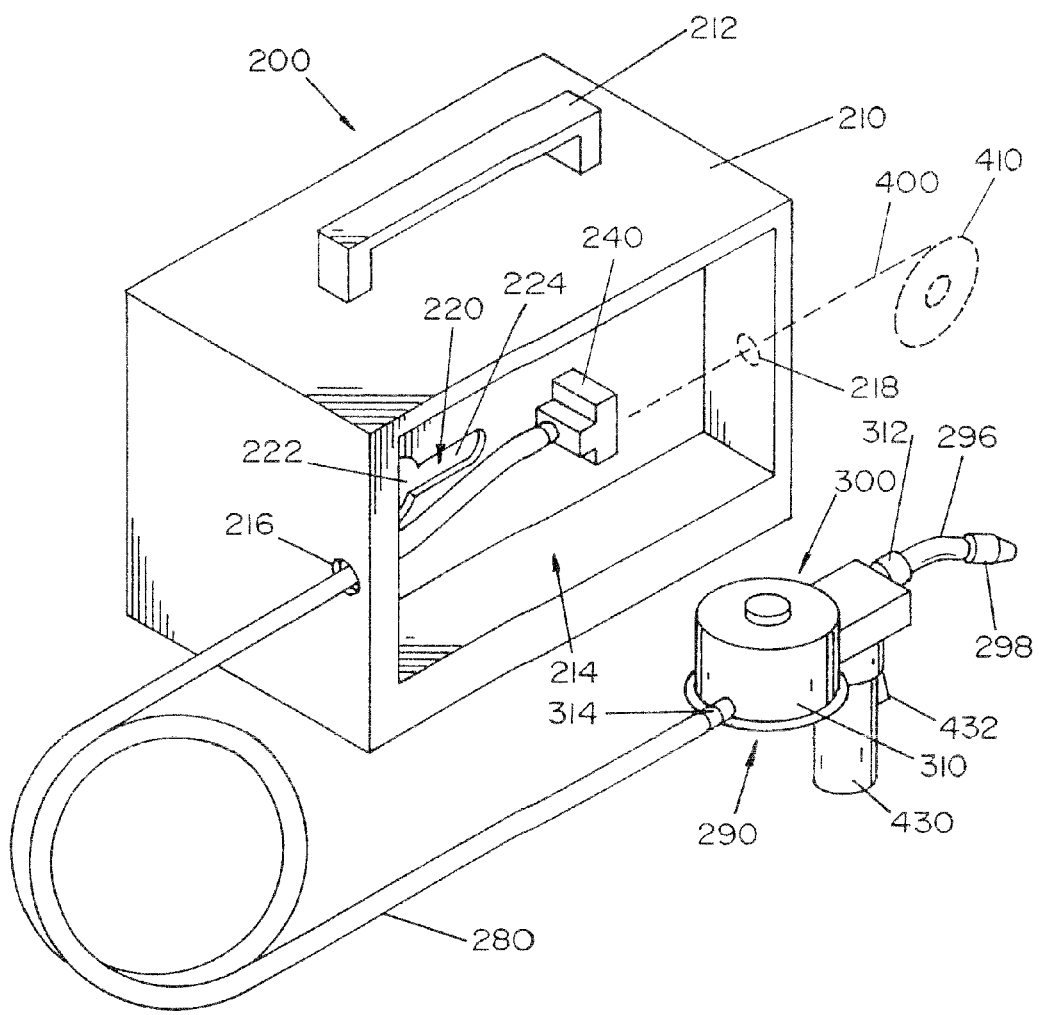
FIG. 5 is a front perspective view of a spool gun in accordance with the present invention.

Referring now to FIG. 5, welding wire feed drive is shown to be disconnected from drive housing interface 220 of housing 210 and connected to the welding gun. One end of welding cable 280 is connected to interface block 240. The front of the drive interface can include a connection arrangement (e.g., threaded connection, clamp connection, quick-release connector, etc.) to facilitate in securing the end of the welding cable to the interface block. In this configuration, interface block 240 can be adapted to 1) provide an electrical interface between the wire feeder and the welding gun via the welding cable so as to enable communication and/or control between the welding wire feed drive and the welding gun, 2) provide an electrical interface between the wire feeder and the welding gun via the welding cable so as to supply power to the welding wire feed drive and/or welding gun, and/or 3) guide an external welding wire source into the welding cable. As illustrated in FIG. 5, a dotted line represents welding wire 400 that is being provided from an external source 410 (e.g., wire spool, wire drum, wire package, etc.). Housing 210 can include a rear opening 218 that enables an external source of welding wire to enter the housing of the wire feeder. As can be appreciated, the external source of welding wire can be positioned in cavity 214 of the housing, thus eliminating the need for rear opening 218. When an external source of welding wire is used, an opening 242 is located in interface block 240.

When the welding wire feed drive is incorporated into the welding gun as shown in FIG. 5, the body 292 of the welding gun is replaced with welding wire feed drive 300. The barrel 296 of the welding gun is disconnected from body 292 and connected to front opening 312 in housing 310 of the welding wire feed drive. Front opening 312 can include a connection arrangement (e.g., threaded connection, clamp connection, quick-release connector, etc.) to facilitate in securing the barrel to housing 310. The end of welding cable 280 is also disconnected from body 292 and connected to rear opening 314 of housing 310. Rear opening 314 can include a connection arrangement (e.g., threaded connection, clamp connection, quick-release connector, etc.) to facilitate in securing the welding cable to housing 310. A handle 430 can be connected to the welding wire feed drive to provide protection to one or more regions of the welding wire feed drive, to facilitate in the handling and/or operating of the welding gun that includes the welding wire feed drive, and/or to provide one or more control elements (e.g., control trigger, etc.) that are used to facilitate in the operation of the welding gun, wire feeder and/or welding unit. The welding wire feed drive, when connected to the welding gun, is designed to push welding wire a short distance through the welding gun 290, This configuration is commonly used for less rigid welding wire such as, but not limited to, aluminum welding wire.

As represented in FIGS. 3-5, the welding wire feed drive of the present invention enables an operator to easily convert and rather quickly modify the welding gun for use with a particular welding wire and/or welding operation. The welding wire feed drive can be positioned in the wire feeder when using a more rigid welding wire that can be pushed through a welding cable and into a welding gun. In such a configuration, the welding gun does not include the unneeded drive rollers and motor as existing in prior art welding guns such as MAGNUM SG spool gun and the PRINCE XL spool gun. When a welding operation requires the use of a less rigid welding wire, the welding wire feed drive can be easily and quickly detached from the wire feeder and connected to the welding gun. In this configuration only a single motor arrangement and drive roller mechanism exists on the welding gun, thus the need to disable a welding wire feed drive arrangement on the wire feeders, as required in past welding units, is eliminated.

Figure 6:
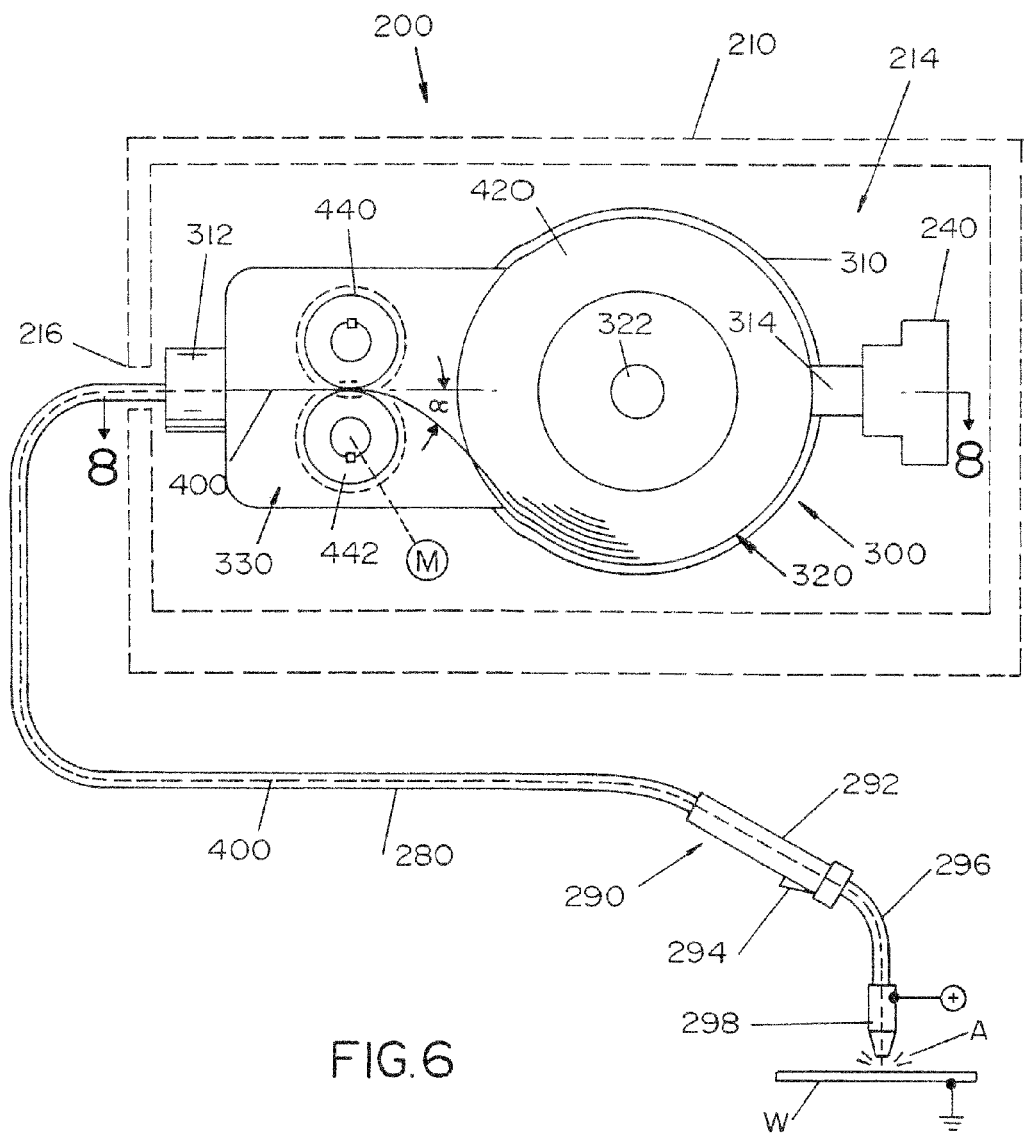
FIG. 6 is a front view of the modular wire feed drive that is positioned in a wire feeder in accordance with the present invention.

Referring now to FIGS. 6-10, several detailed views of a few of the many embodiments of the modular welding wire feed drive arrangement are illustrated. FIG. 6 illustrates a front view of the welding wire feed drive arrangement 300 while connected in cavity 214 of the wire feeder. The housing 310 of the welding wire feed drive includes three principle compartments, namely, 1) a wire spool compartment 320, 2) a drive roller compartment 330, and 3) a motor compartment 340. The wire spool compartment is adapted to rotatably secure a spool 420 of welding wire. A central mount 322 can be used to rotatably mount the spindle of the wire spool in the wire spool compartment. As can be appreciated, a spool of wire need not be used when the welding wire feed drive is secured in the wire feeder. An external source of welding wire can be fed into the wire spool compartment via rear opening 314. When a wire spool is used, the wire spool maintains its tension to inhibit or prevent the welding wire from uncontrollably unraveling from the wire spool. The amount of tension applied to the wire spool can be fixed or adjustable. The tension mechanism can be part of the central mount 322 or be provided by another or additional arrangement.

Figure 10:
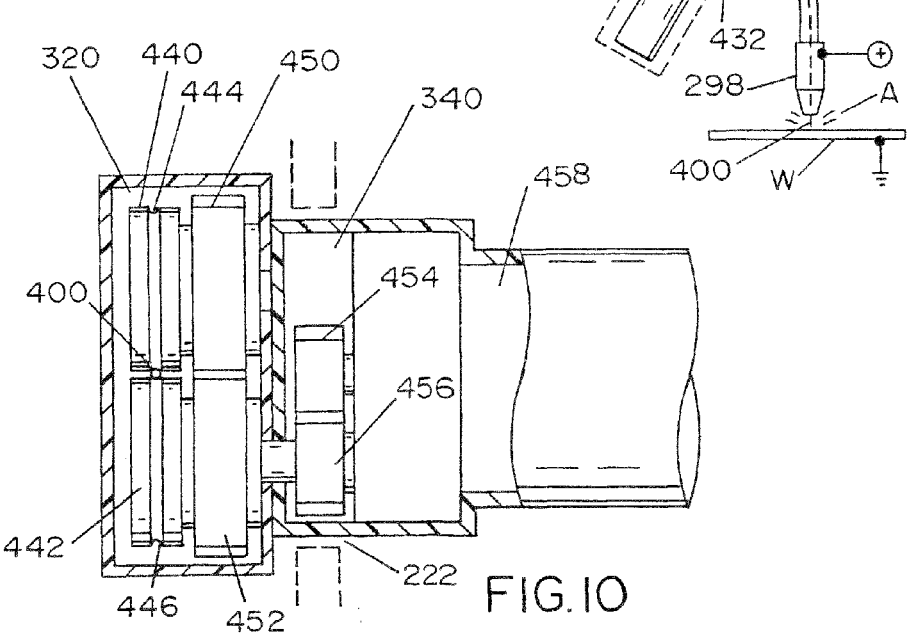
FIG. 10 is across-sectional view alone lines 10-10 of FIG. 9.

The welding wire 400 from the wire spool or external source is adapted to move from the wire spool compartment 320 to drive roller compartment 330. Drive roller compartment 330 includes two drive rollers 440, 442. As can be appreciated, a greater or lesser number of drive rollers can be used. The drive rollers are positioned adjacent to one another such that the welding wire passes between the drive rollers. The wire spool is positioned in the wire spool compartment such that the welding wire fed from the wire spool has a maximum feed angle a relative to the reed axis (as indicated by a dotted line) from the drive roller of less than about 50°. The drive rollers can each include a guide groove 444, 446 as illustrated in FIG. 10 to facilitate in the feeding of the welding wire between the drive rollers when the drive rollers are rotating. The drive rollers are connected to a gear arrangement that includes gears 450, 452, 454, 456. As can be appreciated, many types of gear arrangements can be used which include the same, less, or more gears. The gear arrangement is designed to cause the two drive rollers to rotate in opposite directions. The gear arrangement is also designed to rotate the two drive rollers at a proper speed relative to one another to achieve the desired welding wire feed rate. Typically when the drive rollers are the same size, the gear arrangement rotates the drive rollers at substantially the same speeds however, when the drive rollers are a different size, the speed of rotation of the two drive rollers may be different. As illustrated in FIG. 10, the gears of the gear arrangement are located in the drive roller compartment and the motor compartment. As can be appreciated, the gears can be positioned in other ways (e.g., all gears in the drive roller compartment, all gears in the motor compartment, most gears in the drive roller compartment, most gears in the motor compartment, gears in the wire spool compartment, etc.).

A motor 458 is used to rotate the gears of the gear arrangement. The motor is typically an electrical motor located in the motor compartment 340. The motor is typically powered by the wire feeder or welding unity however, a motor battery, not shown, can be used to power the motor.

Referring again to FIG. 6, the welding gun includes a trigger 294 that is activated by a user to control the advancement of the welding wire by the welding wire feed drive arrangement which is positioned in the wire feeder. A control cable or wire, not shown, is connected between the welding gun and the wire feeder via the welding cable 280. As the welding wire is advanced by the welding wire feed drive arrangement, the welding wire is pushed through the welding gun and out from welding tip 298. An electric arc A melts a portion of the welding wire and the molten metal is deposited on workpiece W. The welding cable is designed to provide power from the wire feeder to the welding gun to generate electric arc A.

Figure 7:
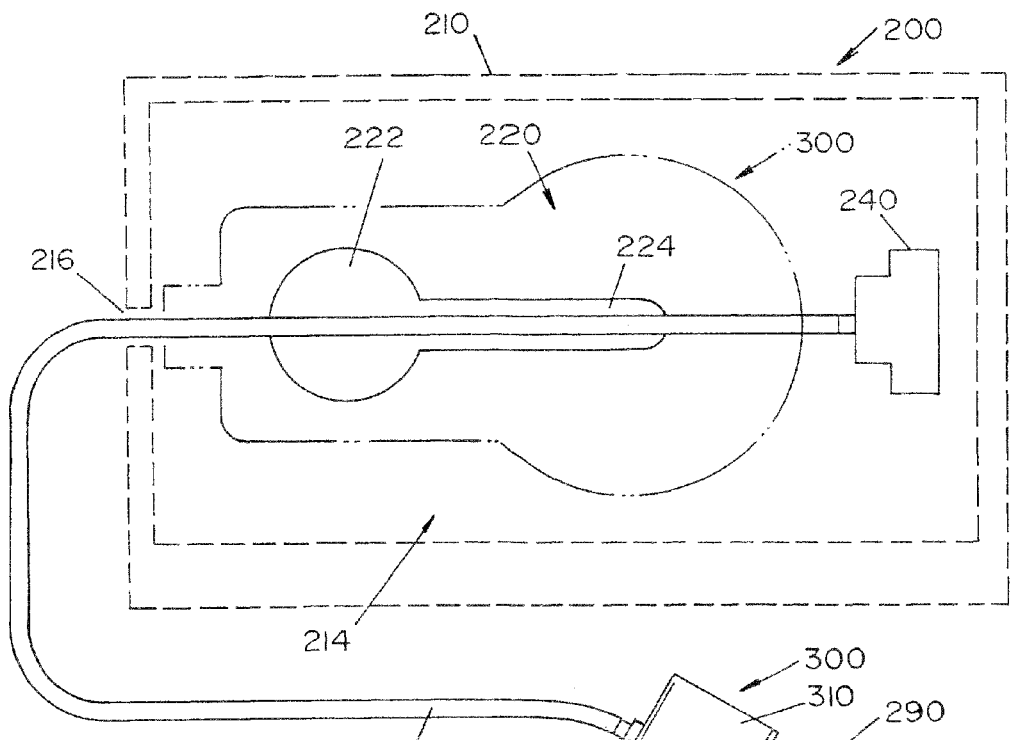
FIG. 7 is a front elevation view of the modular wire feed drive that is positioned on a wire feeder showing the modular wire feed drive removed from a wire feeder and connected to a welding gun in accordance with the present invention.

Referring to FIG. 7, the welding wire feed drive 300 is disconnected from drive housing interface 220 of wire feeder 200 and forms part of welding gun 290. As shown in FIG. 7, the drive housing interface 220 includes a, circular opening 222 that is adapted to receive the portion of housing 310 that includes the motor compartment 340. The drive housing interface 220 also includes a longitudinal slot 224 that can be used to facilitate in the connection of the welding wire feed drive to the drive housing interface 220. As can be appreciated, the drive housing interface 220 can have many other configurations. One end of the welding cable 280 is connected to interface block 240. The other end of the welding cable is connected to rear opening 314 in the housing of welding wire feed drive. A detachable handle 430 is connected to the housing of the welding wire feed drive, the handle is used by the operator of the welding gun to facilitate in the use of the welding gun. The handle can include a trigger 432 that is used to control the operation of the welding wire feed drive to advance the welding wire through the welding gun. The handle can include other or additional controls to monitor and/or control other features of the welding gun, wire feeder and/or welding unit.

Figure 8:
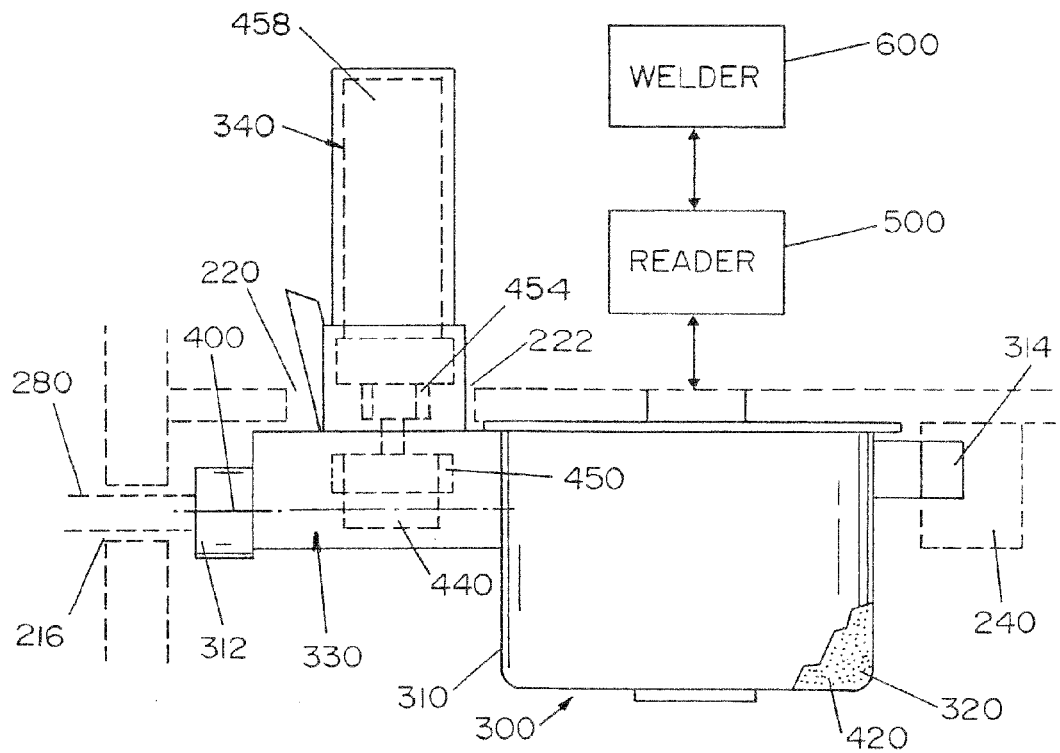
FIG. 8 is a cross-sectional view alone lines 8-8 of FIG. 6.
Figure 9:
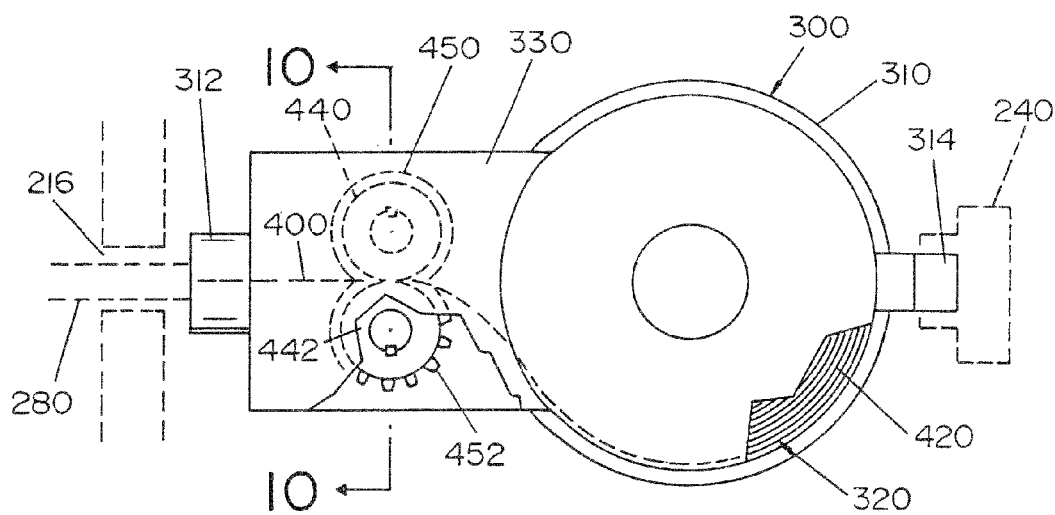
FIG. 9 is a front view of the modular wire feed drive of FIG. 8.

Referring now to FIG. 8, the welding wire feed drive can include an interface that is used to send and/or receive information between a reader 500. The reader can be part of handle 430 and/or can be part of drive housing interface 220. The information sent and/or received can be information to control and/or monitor one or more components of the welding system. As shown in FIG. 8, the information transferred to and/or from the reader 500 is monitored and/or received by a welder 600 that is connected to the wire feeder and/or integrated with the wire feeder. The welder in turn can be designed to send and/or receive information to the reader. The reader can obtain information mechanically, electrically, electromagnetically, etc.

Referring now to FIG. 4, the housing of the welding wire feed drive can include one or more visual identifiers 700 that can be used to provide information about one or more characteristics of the welding wire feed drive. The drive housing can include one or more transparent and/or semitransparent regions to enable a user to view inside the drive housing to obtain information about the welding wire feed drive (e.g., amount of welding wire remaining on the spool, etc.).

The invention has been described with reference to a preferred embodiment and alternates thereof. It is believed that many modifications, alterations to the embodiments disclosed readily suggest themselves to those skilled in the art upon reading and understanding the detailed description of the invention. It is intended to include all such modifications and alterations in-so-far as they come within the scope of the present invention.

We claim:

1. A modular-detachable welding wire feed drive for use with a wire feeder welding system having a welding cable or a gun wire feeder welding system having a gun barrel, said welding wire feed drive including a drive housing, a wire contact arrangement and a drive motor, said drive housing having a handle portion and a trigger, said trigger being connected to said drive motor to selectively operate said drive motor, said drive housing is adapted to be detachably connectable to the wire feeder and the gun wire feeder, said wire contact arrangement designed to controllably feed welding wire at least partially through said housing, said drive motor connected to or interconnected to said wire contact arrangement to at feast partially drive said wire contact arrangement; wherein said drive housing includes a first opening having a connector associated therewith to attach the welding cable to said first opening when said drive housing is used in connection with the wire feeder welding system and said connector being adapted to attach the gun barrel to said first opening when said drive housing is used in connection with the gun wire feeder welding system.

2. The welding wire feed drive as defined in claim 1, wherein said wire contact arrangement includes at least one drive roller.

3. The welding wire feed drive as defined in claim 1, including a gear arrangement to interconnect said drive motor to said wire contact arrangement.

4. The welding wire feed drive as defined in claim 2, including a gear arrangement to interconnect said drive motor to said wire contact arrangement.

5. The welding wire feed drive as defined in claim 1, including a wire guide designed to at least partially guide said welding wire from said wire contact arrangement to an exterior of said drive housing.

6. The welding wire feed drive as defined in claim 4, including a wire guide designed to at least partially guide said welding wire from said wire contact arrangement to an exterior of said drive housing.

7. The welding wire feed drive as defined in claim 1, wherein said drive housing includes a wire spool compartment designed to contain a spool of welding wire.

8. The welding wire feed drive as defined in claim 6, wherein said drive housing includes a wire spool compartment designed to contain a spool of welding wire.

9. The welding wire feed drive as defined in claim 7, wherein said wire spool compartment is designed to enable replacement of said spool of welding wire.

10. The welding wire feed drive as defined in claim 7, including a wire spool tension arrangement designed to apply tension to said spool as such spool rotates in said drive housing.

11. The welding wire feed drive as defined in claim 1, including an identification arrangement at least partially on an exterior of said drive housing, said identification arrangement providing information about at least one component characteristic of said welding wire feed drive, said component characteristic including characteristic selected from the group consisting of type of said welding wire to be used with said welding wire feed drive, type of said welding wire including in said drive housing, diameter of said welding wire to be used with said welding wire feed drive, gear ratio of said gear arrangement in said drive housing, type of motor in said drive housing, speed or recommended speed of said motor in said drive housing, wire tension or recommended wire tension associated with said wire contact arrangement, current or recommended spool break tension, set or recommended welding wire feed speed, amount of said welding wire remaining on said wire spool, amount of use of said welding wire feed drive, model information about said welding wire feed drive, parts information regarding said welding wire feed drive, information about when said welding wire feed. drive was used, information about what welding unit said welding wire feed drive was used, information about the proper welding unit said welding wire feed drive can be used with, voltage information for operation of said welding wire feed drive, current information for the operation of said welding wire feed drive, voltage information for a welding power wave, current information for a welding power wave, welding wire polarity information for a welding power wave, shielding gas information, or combinations thereof.

12. The welding wire feed drive as defined in claim 6, including an identification arrangement at least partially on an exterior of said drive housing, said identification arrangement providing information about at least one component characteristic of said welding wire feed drive, said component characteristic including characteristic selected from the group consisting of type of said welding wire to be used with said welding wire feed drive, type of said welding wire included in said drive housing, diameter of said welding wire to be used with said welding wire feed drive, gear ratio of said gear arrangement in said drive housing, type of motor in said drive housing, speed or recommended speed of said motor in said drive housing, wire tension or recommended wire tension associated with said wire contact arrangement, current or recommended spool break tension, set or recommended welding wire feed speed, amount of said welding wire remaining on said wire spool, amount of use of said welding wire feed drive, model information about said welding wire feed drive, parts information regarding said welding wire feed drive, information about when said welding wire feed drive was used, information about what welding unit said welding wire feed drive was used, information about the proper welding unit said welding wire feed drive can be used with, voltage information for operation of said welding wire feed drive, current information for the operation of said welding wire feed drive, voltage information for a welding power wave, current information for a welding power wave, welding wire polarity information for a welding power wave, shielding gas information, or combinations thereof.

13. The welding wire feed drive as defined in claim 1, including a control interface that provides information between said welding wire feed drive and said welding system.

14. The welding wire feed drive as defined in claim 12, including a control interface that provides information between said welding wire feed drive and said welding system.

15. The welding wire feed drive as defined in claim 1, wherein an exterior of said drive housing includes a color coding used to identify at least one characteristic of said welding wire feed drive.

16. The welding wire feed drive as defined in claim 14, wherein an exterior of said drive housing includes a color coding used to identify at least one characteristic of said welding wire feed drive.

17. The welding wire feed drive as defined in claim 1, wherein said drive motor and said wire contact arrangement are at least partially contained in said drive housing.

18. The welding wire feed drive as defined in claim 16, wherein said drive motor and said wire contact arrangement are at least partially contained in said drive housing.

19. The welding wire feed drive as defined in claim 1, including a wire spool cartridge detachably connectable to said drive housing, said wire spool cartridge including a spool cavity to rotatably secure a spool of wire and said wire contact arrangement.

20. The welding wire feed drive as defined in claim 18, including a wire spool cartridge detachably connectable to said drive housing, said wire spool cartridge including a spool cavity to rotatably secure a spool of wire and said wire contact arrangement.

21. A modular-detachable welding wire feed drive for use in a wire feeder welding system and a gun wire feeder welding system, said welding wire feed drive including a drive housing, a wire contact arrangement and a drive motor; said drive housing having a handle portion and a trigger being connected to said drive motor to selectively operate said drive motor; wherein said drive housing is detachably secured to the housing of a welding system, said drive housing having a first opening including at least one connector to detachably secure said drive housing to at least a portion either of the wire feeder and gun wire feeder welding system, said drive housing including a wire guide designed to at feast partially guide said welding wire from said wire contact arrangement to a second opening in an exterior of said drive housing; said wire contact arrangement designed to controllably feed welding wire at least partially through the second opening in said drive housing, said wire contact arrangement including a plurality of drive rollers, said plurality of drive rollers at least partially located in said drive housing, said wire contact arrangement including a gear arrangement to interconnect said drive motor to at least one of said drive rollers; said drive motor connected to or interconnected to said wire contact arrangement to at least partially drive at least one of said drive rollers, said drive motor at least partially located in said drive housing.

22. A welding wire feed drive adapted for use in a welder wire feeder and a gun wire feeder welding system, said welding wire feed drive comprising:
a drive housing having a connector adapted to releasably secure said drive housing to a cable when said drive housing is connected to the welder wire feeder welding system and a gun barrel when said drive housing is connected to the gun wire feeder wire welding system;
a wire contact arrangement and a drive motor housed within said drive housing, said wire contact arrangement being adapted to controllably feed welding wire through said drive housing, wherein said drive motor is connected to said wire contact arrangement to at least partially drive said wire contact arrangement, wherein wire from said wire contact arrangement is fed through said drive housing to a selected one of the wire feeder and gun wire feeder welding systems said drive housing having a handle portion and a trigger, said trigger being connected to said drive motor to selectively operation said drive motor.

23. The welding wire feed drive of claim 22, wherein said connector is selected from the group consisting of a tab, a latch, and a quick-connect.

24. The welding wire feed drive of claim 22 further comprising an interface block, said interface block including an electrical interface adapted to provide communication between the wire feed drive and either of the wire feeder or gun wire feeder welding systems.

* * * * *

UNITED STATES PATENT AND TRADEMARK OFFICE
CERTIFICATE OF CORRECTION

| | | |
|---|---|---|
| PATENT NO. | : 7,999,209 B2 | Page 1 of 1 |
| APPLICATION NO. | : 12/507523 | |
| DATED | : August 16, 2011 | |
| INVENTOR(S) | : Diekmann et al. | |

It is certified that error appears in the above-identified patent and that said Letters Patent is hereby corrected as shown below:

Column 17, line 34, claim 1, delete "feast" and insert --least--.

Column 19, line 40, claim 21, delete "feast" and insert --least--.

Signed and Sealed this
Twenty-second Day of November, 2011

David J. Kappos
*Director of the United States Patent and Trademark Office*